(12) United States Patent
Tsiouvaras et al.

(10) Patent No.: US 11,508,994 B2
(45) Date of Patent: Nov. 22, 2022

(54) METHOD FOR PRODUCING A LITHIUM-ION CELL

(71) Applicant: Bayerische Motoren Werke Aktiengesellschaft, Munich (DE)

(72) Inventors: Nikolaos Tsiouvaras, Munich (DE); Thomas Woehrle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/069,898

(22) Filed: Oct. 14, 2020

(65) Prior Publication Data

US 2021/0028499 A1    Jan. 28, 2021

Related U.S. Application Data

(60) Division of application No. 15/625,159, filed on Jun. 16, 2017, which is a continuation of application No. PCT/EP2015/080146, filed on Dec. 17, 2015.

(30) Foreign Application Priority Data

Dec. 18, 2014    (DE) .................... 10 2014 226 394.8

(51) Int. Cl.
| | |
|---|---|
| *H01M 10/0587* | (2010.01) |
| *H01M 10/0525* | (2010.01) |
| *H01M 10/0583* | (2010.01) |
| *H01M 4/04* | (2006.01) |
| *H01M 4/139* | (2010.01) |
| *H01M 10/04* | (2006.01) |

(52) U.S. Cl.
CPC ..... *H01M 10/0587* (2013.01); *H01M 4/0404* (2013.01); *H01M 4/0416* (2013.01); *H01M 4/0435* (2013.01); *H01M 4/139* (2013.01); *H01M 10/0431* (2013.01); *H01M 10/0525* (2013.01); *H01M 10/0583* (2013.01); *Y02E 60/10* (2013.01)

(58) Field of Classification Search
CPC .................................................... H01M 4/0416
See application file for complete search history.

(56) References Cited

U.S. PATENT DOCUMENTS

| | | | |
|---|---|---|---|
| 3,918,989 | A | 11/1975 | Gillman et al. |
| 5,478,668 | A | 12/1995 | Gozdz |
| 6,358,646 | B1 | 3/2002 | Nakagawa |

(Continued)

FOREIGN PATENT DOCUMENTS

| | | |
|---|---|---|
| CN | 1424784 A | 6/2003 |
| DE | 10 2010 039 416 A1 | 2/2012 |

(Continued)

OTHER PUBLICATIONS

Machine translation of JP 2002-008722, Jan. 2002.*

(Continued)

*Primary Examiner* — Jonathan Crepeau
(74) *Attorney, Agent, or Firm* — Crowell & Moring LLP

(57) ABSTRACT

A method for producing a lithium-ion cell is provided. The electrochemically active coating of an electrode is brought into contact with an electrolyte or an auxiliary liquid before a winding or cutting operation. This method is suitable in particular for continuously producing lithium-ion cells by means of processes proceeding at high speed, such as winding processes.

11 Claims, 1 Drawing Sheet

(56) References Cited

U.S. PATENT DOCUMENTS

| | | | |
|---|---|---|---|
| 6,364,916 B2 | 4/2002 | Andrieu et al. | |
| 6,677,082 B2 | 1/2004 | Thackeray et al. | |
| 6,680,143 B2 | 1/2004 | Thackeray et al. | |
| 7,205,072 B2 | 4/2007 | Kang et al. | |
| 2003/0113637 A1 | 6/2003 | Birke-Salam et al. | |
| 2011/0212359 A1 | 9/2011 | Dai et al. | |
| 2013/0209877 A1 | 8/2013 | Kren et al. | |

FOREIGN PATENT DOCUMENTS

| | | |
|---|---|---|
| EP | 0 971 433 A1 | 1/2000 |
| EP | 1 317 012 A2 | 6/2003 |
| JP | 2002-8722 A | 1/2002 |
| JP | 2003-92142 A | 3/2003 |

OTHER PUBLICATIONS

International Search Report (PCT/ISA/210) issued in PCT Application No. PCT/EP2015/080146 dated Mar. 2, 2016 with English translation (Six (6) pages).

German-language Written Opinion (PCT/ISA/237) issued in PCT Application No. PCT/EP2015/080146 dated Mar. 2, 2016 (Eight (8) pages).

German-language Search Report issued in counterpart German Application No. 10 2014 226 394.8 dated Nov. 6, 2015 with partial English translation (13 pages).

Zhang, "A Review of the Electrochemical Performance of Alloy Anodes for Lithium-Ion Batteries", Journal of Power Sources, 196, 2011, pp. 13-24.

Xu et al., "Recent Progress in Cathode Materials Research for Advanced Lithium Ion Batteries", Materials Science and Engineering R 73, 2012, pp. 51-65.

Whittemore et al., "Pore Structure Characterization by Mercury Porosimetry". Advances in material characterization, D. R. Rossington and R. A. Condrate, 1983, Plenum Press, New York.

Chinese-language Office Action issued in Chinese Application No. 201580066310.6 dated May 19, 2020 with English translation (11 pages).

Machine translation of JP 2003-092142, Mar. 2003.

* cited by examiner

METHOD FOR PRODUCING A LITHIUM-ION CELL

CROSS REFERENCE TO RELATED APPLICATIONS

This application is a divisional of U.S. patent application Ser. No. 15/625,159, filed Jun. 16, 2017, which is a continuation of PCT International Application No. PCT/EP2015/080146, filed Dec. 17, 2015, which claims priority under 35 U.S.C. § 119 from German Patent Application No. 10 2014 226 394.8, filed Dec. 18, 2014, the entire disclosures of which are herein expressly incorporated by reference.

BACKGROUND AND SUMMARY OF THE INVENTION

The present invention relates to a method for producing a lithium-ion cell with high energy density, specific energy, and long lifetime. This method is especially suitable for continuous production of lithium-ion cells with operations which proceed at high speed such as winding processes.

A lithium-ion cell, as an individual electrochemical cell, is the smallest elementary functional unit of a lithium-ion battery. As used herein, the term "lithium-ion battery" refers to both a rechargeable battery (secondary battery) and a non-chargeable battery (primary battery). A rechargeable lithium-ion battery is synonymous with a secondary lithium-ion battery. Both terms also encompass a lithium battery and a lithium-ion accumulator. A battery consists of at least two connected cells.

Typically, in a lithium-ion battery, two or more lithium-ion cells are connected in series or in parallel. A lithium-ion cell here comprises two electrodes of opposite polarity, the negative anode and the positive cathode. Both electrodes are insulated electrically and mechanically from one another by a separator disposed between the electrodes. The lithium-ion cell is filled with an electrolyte. The separator is permeable to lithium ions, allowing the ions to be exchanged between the anode and the cathode in the charging/discharging process.

A typical electrode construction customarily comprises an electrode collector, for example a metallic support foil or a metal foil, coated at least with an electrochemically active material. The electrode collector serves primarily to take off the current. The electrochemically active materials are capable of accepting or releasing lithium ions during charging and discharging of the cell, respectively. At the same time they are able to accept and release electrons.

For the provision of the electrodes, the electrode collector is coated with the electrochemically active material. For this purpose, customarily, a mixture of the electrochemically active material and a binder, and also an electrical conductive material, in a carrier solvent is prepared and is applied to the collector by means, for example, of an applicator roll. The coated electrode collector is subsequently passed, for example, through a continuous oven, and so the carrier solvent evaporates and the binder sets. This achieves binding within the electrochemically active material and also facilitates adhesion of the coating to the collector, such as to a metallic collector foil.

The lithium-ion cell is subsequently made up of a pair of positive and negative electrodes and a separator. The lithium-ion cell may be configured, for example, as a cylindrical winding, prismatic flat winding or cell stack. For producing a cylindrical winding or prismatic flat winding cell, for example, the components are placed one atop another in the sequence of an anode, a separator, a cathode, and a separator, and are subsequently rolled or folded together. Both processes may also be referred to below under the general term "winding". For the cell stack configuration, the components are first cut to size, and a stack is formed from an anode, a separator, and a cathode. An alternative method is first to stack the components from the roll. Only then are individual stacks cut to size, for example, by die cutting.

Pressure may be exerted on the winding or cell stack in order to ensure an effective bond between the components, especially between the electrodes and the separator, within the lithium-ion cell.

A problem is that the electrochemically active coating of the electrodes is often brittle with hardly any elastic behavior. These properties are detrimental to the production of the lithium-ion cell. During the winding or cutting of the electrodes, for example, cracks and breaks may occur in the electrochemically active coating. At the same time there may be instances of detachment at the interface between the active material and the collector. The consequences are a loss of active material, uneven charging of the electrode, and ultimately, a reduced battery life.

From U.S. Pat. No. 3,918,989 and DE 102010039416 A1, it is known that the addition of plasticizers to the active material may improve the flexibility and processability of the electrodes. Such plasticizers, however, represent an inactive component within the active material and they therefore detract from the energy density of the lithium-ion cell. Removal of the plasticizer necessitates additional method steps such as chemical extraction and gives rise to additional costs. Typical plasticizers which are often used, such as dibutyl phthalate (DBP), are extremely toxic, and the commonly used extraction solvents such as n-hexane are combustible, and so with these methods, moreover, it is necessary to take increased safety precautions.

It is an object of the present disclosure to provide an improved method for producing a lithium-ion cell that at least partly solves the problems identified above.

Various objects, advantages and novel features of the present invention will become apparent from the following detailed description of one or more preferred embodiments when considered in conjunction with the accompanying drawings.

According to one aspect of the disclosure, a method for producing a lithium-ion cell is provided which includes the following steps:

In step A), a first electrode having a first electrode collector and a first electrochemically active coating is applied onto the first electrode collector, and a second electrode having a second electrode collector and a second electrochemically active coating is applied onto the second electrode collector, are provided.

The first and/or second electrode is preferably coherent in sheet form in a longitudinal direction. In this way, the first and second electrodes can advantageously be provided continuously, for example, by unwinding of the electrodes from a roll. In one embodiment, the method of the invention is performed substantially continuously.

The first and second electrodes include at least one negative electrode (anode) and one positive electrode (cathode). For example, the first electrode may be configured as a negative electrode, and the second electrode as a positive electrode. As used herein, the term "negative electrode" refers to the electrode which in operation of the lithium-ion cell is capable of releasing electrons. The term "positive electrode", conversely, refers to the electrode which in operation of the lithium-ion cell is capable of accepting electrons.

For an electrochemically active coating of the negative electrode (or the anode), it is possible to use any active materials which are known in the art. The electrochemically active coating of the negative electrode may be selected from the group consisting of lithium metal oxide, such as lithium titanium oxide $Li_4Ti_5O_{12}$, metal oxide, such as $Fe_2O_3$, ZnO, and $ZnFe_2O_4$, carbon-containing materials such as graphite, e.g., synthetic graphite or natural graphite, graphene, mesocarbon, doped carbon, hard carbon, soft carbon, mixtures of silicon and carbon, silicon, lithium alloys, and mixtures thereof. In particular, it is possible to use niobium pentoxide, tin alloys, titanium dioxide, tin dioxide, and silicon.

It is also possible for the electrochemically active coating of the negative electrode to use a material which can be alloyed with lithium. This may be a lithium alloy or a non-lithiated or partially lithiated precursor thereof, from which a lithium alloy is produced during formation. Preferred materials which can be alloyed with lithium are lithium alloys selected from the group consisting of silicon-based, tin-based, and antimony-based alloys. Such alloys are described for example in the review article of W. J. Zhang, Journal of Power Sources 196 (2011) 13-24.

For an electrochemically active coating of the positive electrode (or the cathode), it may be selected independently of the electrochemically active coating of the negative electrode. It may also use any active materials which are known in the art. Such materials include, for example, $LiCoO_2$ (LCO), lithium nickel cobalt manganese oxide (NCM), lithium nickel cobalt aluminum oxide (NCA), high-energy NCM or HE-NCM (high energy NCM), lithium iron phosphate or lithium manganese spinel $LiMn_2O_4$.

In one preferred embodiment, materials used as the electrochemically active coating of the positive electrode may be those selected from the group consisting of lithium transition-metal oxide, layered oxides, spinels, olivine compounds, silicate compounds, HE-NCM, and mixtures thereof. Such materials are described for example in Xu et al. "Recent Progress in Cathode Materials Research for Advanced Lithium Ion Batteries", *Material Science and Engineering* R, 73 (2012), 51-65. Another preferred cathode material is HE-NCM. Layered oxides and HE-NCM are also described in U.S. Pat. Nos. 6,677,082, 6,680,143, and 7,205,072.

Examples of olivine compounds include lithium phosphates of empirical formula $LiXPO_4$ where X=Mn, Fe, Cu or Ni, or combinations thereof.

Examples of lithium transition-metal oxide, spinel compounds, and layered oxides are lithium manganate, preferably $LiMn_2O_4$, lithium cobaltate, preferably $LiCoO_2$, lithium nickelate, preferably $LiNiO_2$, or mixtures of two or more of these oxides, or their mixed oxides.

The electrochemically active coating of the positive electrode may also include mixtures of two or more of the substances described herein.

In order to increase the electrical conductivity, further compounds are included in the electrochemically active material, preferably carbon-containing compounds, or carbon, preferably in the form of conductive carbon black or graphite. The carbon may also be introduced in the form of carbon nanotubes. Such additions are preferably present in an amount of 0.1 to 6 percent by weight, preferably from 1 to 3 percent by weight, based on the total electrode mass of the electrochemically active coating applied onto the electrode collector.

The first and/or second electrochemically active coating may include one or more binders which facilitate adhesion within the electrochemically active coating itself and/or adhesion of the electrochemically active coating to the electrode collector. Such binders may for example be selected from the group consisting of polyvinylidene fluoride (PVDF), polyvinylidene fluoride-hexafluoropropylene copolymer (PVDF-HFP), polyethylene oxide (PEO), polytetrafluoroethylene, polyacrylate, styrene-butadiene rubber (SBR), carboxymethylcellulose (CMC), and mixtures and copolymers thereof. The binders are preferably present in an amount of 0.5 to 8 percent by weight in relation to the total mass of the electrode.

The electrode collector of the negative electrode may for example include copper. The electrode collector of the positive electrode may for example include aluminum. The electrode collectors are preferably configured in a foil form, for example as a copper foil or an aluminum foil respectively.

In the subsequent step B), at least part of the first and/or second electrochemically active coating is contacted with an electrolyte.

As used herein, an electrolyte in accordance with the invention is understood to mean a liquid in which a conductive lithium salt is in solution. The electrolyte may for example contain a conductive lithium salt and an organic solvent.

In preferred embodiments, the organic solvent is selected from the group consisting of ethylene carbonate, propylene carbonate, diethyl carbonate, dimethyl carbonate, ethyl methyl carbonate, acetonitrile, gamma-butyrolactone, dimethoxyethane, 1,3-dioxolane, methyl acetate and/or mixtures thereof.

The solvent is preferably an organic carbonate. More particularly the organic solvent is selected from the group consisting of cyclic carbonates such as ethylene carbonate and propylene carbonate and/or linear carbonates such as diethyl carbonate, dimethyl carbonate, and ethyl methyl carbonate, and also mixtures thereof. With further preference, the organic solvent is selected from the group consisting of ethylene carbonate, diethyl carbonate, dimethyl carbonate, ethyl methyl carbonate, and mixtures thereof. One particularly preferred solvent is ethylene carbonate (1,3-dioxolan-2-one).

In one preferred embodiment, the organic solvent includes a mixture of ethylene carbonate and at least one further organic solvent, such as gamma-butyrolactone. Binary mixtures of carbonates are also possible, particularly of ethylene carbonate with a further carbonate, such as diethyl carbonate, dimethyl carbonate and/or ethyl methyl carbonate, especially diethyl carbonate.

Other examples of the solvent include ternary mixtures, having at least one carbonate as the solvent. Especially preferred are mixtures of ethylene carbonate with a further solvent, such as gamma-butyrolactone, and a further compound which is suitable for forming a stable solid/electrolyte interface, on the graphite, for example, as a protective layer during the first charging step (solid electrolyte interface, SEI).

Suitable compounds are, for example, selected from the group consisting of fluoroethylene carbonate, vinylethylene carbonate, trifluoropropylene carbonate or mixtures thereof.

One suitable organic solvent is, for example, a mixture of ethylene carbonate, gamma-butyrolactone or gamma-valerolactone, and fluoroethylene carbonate.

The electrolyte preferably contains lithium hexafluorophosphate ($LiPF_6$) as the conductive lithium salt. Furthermore, lithium tetrafluoroborate ($LiBF_4$) may be used as the conductive salt, or also LiTFSi.

The contacting may be performed by all methods known in the art that ensure controlled and uniform wetting of the electrochemically active coating with the electrolyte. Non-limiting examples include injecting, spraying, trickling, brushing and/or roll application of the electrolyte. In these embodiments, the principal surface of the electrochemically active coating, facing away from the electrode collector, is preferably contacted with the electrolyte. Preferably at least 50%, at least 70%, at least 80%, at least 90% or the entirety of the principal surface of the electrochemically active coating, facing away from the electrode collector, is contacted with the electrolyte.

Alternatively or additionally, the contacting may also take place by at least partial immersion of the electrochemically active coating into the electrolyte, for example, by passing the electrode material through a contact bath containing the electrolyte.

The electrolyte can be introduced particularly effectively by vacuum impregnation. In one embodiment, a sub-atmospheric pressure or a vacuum is applied in method step B) before and/or during the contacting, in order to withdraw air from the electrochemically active coating in this way. In one aspect, the pressure is less than 800 hPa, preferably, less than 500 hPa, more preferably, less than 300 hPa, and even more preferably, less than 10 hPa.

The contacting is followed, in method step C), by cutting, winding and/or folding of the first and/or second electrode.

Surprisingly, it has been found that by contacting with the electrolyte, the electrochemically active coating, in particular even after the baking of the electrodes, reacquires an advantageous flexibility and elasticity, which considerably improves or facilitates the further processing of the electrodes. In this way, it is possible for the electrodes to be wound, folded and/or cut without cracks or breaks forming in the electrochemically active coating or without there being any detachment phenomena between the electrochemically active coating and the electrode collector.

One advantage of the disclosure is that the sequence of method steps B) and C) can be employed whenever the electrodes are involved in a winding or folding operation or in a cutting process during the production of the lithium-ion cell. It is possible, for example, after the provision of the electrodes, in other words, in particular, after calendering and baking, for the electrodes to be wound up again in the form of a roll, with the aid of method steps B) and C), without damage to the electrochemically active coating, and to be held ready for further processing in the lithium-ion cell. The sequence of method steps B) and C) is likewise highly suitable for cutting the electrodes without defects in the electrochemically active coating, by means of die-cutting, for example, in order to provide cut-to-size electrodes for the production of a cell stack.

In a further method step D), the first electrode is combined with a separator and with the second electrode.

As used herein, the separator is a material which separates the positive electrode and the negative electrode from one another. It is permeable to lithium ions, therefore conducts lithium ions, but it is a nonconductor for electrons. The separator preferably contains a polymer. Suitable polymers are for example selected from the group consisting of polyester, such as polyethylene terephthalate, polyolefin, such as polyethylene or polypropylene, polyacrylonitrile, polyvinylidene fluoride, polyvinylidene-hexafluoropropylene, polyetherimide, polyimide, polyether, polyetherketone, and mixtures thereof. The separator has porosity, and so it is permeable to lithium ions.

In one embodiment, step C) may be carried out before and/or after step D). For example, step C) can be carried out before step D) if, as mentioned above, the first and/or second electrode provided is first to be wound to form the roll and held ready for further processing. Another example is the implementation of step C) before step D) if cut-to-size blanks of first and/or second electrodes are to be made ready for stacking.

Alternatively or additionally, step C) may also be carried out after step D). For example, the method of the invention is especially readily suitable for winding the components combined from the method step D), which are on top of one another in the following order, an anode, a separator, a cathode, a separator, to form a cylindrical winding, or for folding them to form a prismatic flat winding, without the electrochemically active coating suffering mechanical damage as a result of the winding or folding process, respectively. In this regard, in accordance with the invention, lithium-ion cells can be produced with high charge homogeneity, energy density, and increased lifetime, in a particularly reliable way and with few rejects. The same advantages are also ensured by enhanced operational reliability in the production of cell stacks if, in method step D), for example, the components are brought together from the roll in the form of a stack, and then individual stacks are die-cut or cut to size.

To the skilled person it is readily apparent that the concept of the invention can be implemented in various variants, provided that method step B) takes place before method step C). For example, individual steps or a plurality of steps in various combinations may be carried out following the method of the invention. Preferred embodiments include, for example, carrying out the method steps in the order A), B), C), D); A), B), D), C); A), B), C), D), C); A), B), C), D), B), C); or A), D), B), C).

The contacting of the part of the first and/or second electrochemically active coating in method step B) takes place preferably with a volume of the electrolyte that is adapted to a porosity of the coating. For example, the volume of the electrolyte corresponds to the total volume of the pores of the part of the first and/or second electrochemically active coating ±25%, preferably ±15%, more preferably ±10%. The total volume of the pores may be calculated, for example, from the porosity and the area weight or from the area and layer thickness of the coating. The porosity may be determined by any methods commonly used by the skilled person. One suitable method, for example, is mercury porosimetry (see also 0. J. Whittemore and G. D. Halsey "Pore Structure Characterization by Mercury Porosimetry". *Advances in material characterization*, D. R. Rossington and R. A. Condrate, 1983, Plenum Press, New York).

According to one embodiment, after the contacting in step B), the part of the first and/or second electrochemically active coating has the electrolyte in a volume fraction of at most 60% or at most 50% in relation to the total volume of the part of the first and/or second electrochemically active coating.

In another preferred embodiment, after the contacting in step B), the part of the first and/or second electrochemically active coating has the electrolyte in a volume fraction of at least 10% or at least 20% in relation to the total volume of the part of the first and/or second electrochemically active coating.

Within these limits, another advantage of the disclosure is that of ensuring high pliability of the electrochemically active coating without at the same time running the risk of the coating beginning to flow. Customarily, therefore, the volume of electrolyte in the contacting per square meter of electrochemically active coating is less than 100 ml, preferably less than 50 ml, or even less than 35 ml.

Following the method according to the invention, it is possible to produce lithium-ion cells for batteries with high energy density, of the kind employed, for example, in the automotive sector. Such batteries require electrodes having particularly high layer thickness on the part of the electrochemically active coating. A high layer thickness of the electrochemically active coating, however, leads easily to an overloading of the promotion of adhesion by the binder. For this reason, at high layer thickness, the electrochemically active coatings quickly become brittle and fragile. This is especially so for the coating of the negative electrode (or the anode). In the method of the invention, therefore, at least the electrochemically active coating of the electrode configured as the anode is preferably contacted with the electrolyte in method step B). Provision is made in particular for the first and/or second electrochemically active coating to have a layer thickness of at least 50 μm, at least 75 μm, at least 100 μm or at least 150 μm.

In another preferred embodiment, the first and/or second electrode in step C) is conveyed along a longitudinal direction of the electrode, for example, by rolling on or against the electrode. Yet another advantage of the disclosure is that it is possible to perform the processing in step C) at a high conveying speed of the electrode. For example, the electrode can be wound up at high speed, to form the cylindrical winding or prismatic flat winding, for example. In specific method variants, therefore, provision is made for the first and/or second electrode to be conveyed with a speed of at least 5 m/min, at least 10 m/min, at least 25 m/min or at least 50 m/min in method step C).

Surprisingly, it has been found that the method of the invention makes it possible to do entirely without plasticizer in the first and/or second electrochemically active coating and in spite of this to ensure the necessary flexibility and plasticity of the electrochemically active coating for further processing in method step C). Preferably, therefore, the first and/or second electrochemically active coating contains no plasticizer, since in this way a greater energy density is achieved relative to plasticizer-containing electrochemically active coatings, and/or further process steps for removing the plasticizer from the electrochemically active coating can advantageously be avoided.

In a further embodiment, after the components have been combined in method step D), additional electrolyte may be supplied in a further method step E). Step E) may serve in particular for metering in additional electrolyte in an amount which leads to the complete filling of the lithium-ion cell with the electrolyte.

According to another aspect of the disclosure, a method for producing a lithium-ion cell is provided, comprising the following steps:

A') providing a first electrode having a first electrode collector and a first electrochemically active coating applied on the first electrode collector, and a second electrode having a second electrode collector and a second electrochemically active coating applied on the second electrode collector, B') contacting at least part of the first and/or second electrochemically active coating with an auxiliary liquid, C') cutting, winding and/or folding the first and/or second electrode, with step C') taking place after step B'), D') combining the first electrode with a separator and a second electrode, E') supplying an electrolyte.

Unless otherwise indicated, the various definitions described herein apply to all aspects of the invention Again the concept of the invention can be implemented in various variants, provided that method step B') takes place before method step C'). Preferred embodiments, include carrying out the method steps in the order A'), B'), C'), D'), E'); A'), B'), D'), C'), E'); A'), B'), C'), D'), C'), E'); A'), B'), C'), D'), B'), C'), E'); or A'), D'), B'), C'), E').

The auxiliary liquid in method step B') is preferably selected from the group consisting of alkanes, alkenes, alkynes, aromatics, alcohols, organic carbonates, esters, ethers, ketones, lactones, lactanes, nitriles and combinations thereof. Suitable auxiliary liquids include, for example, acetone, isopropanol, tetrahydrofuran, hexane, or dimethyl carbonate, ethyl methyl carbonate or diethyl carbonate. In particular, the auxiliary liquid must not dissolve and/or swell the binder of the electrochemically active coating.

In one preferred embodiment, the auxiliary liquid has a boiling point of at most 120° C. under chemical standard conditions. Chemical standard conditions are understood according to an IUPAC stipulation to be a temperature of 25° C. and a pressure of 1000 hPa.

Such auxiliary liquids may be taken off in an optional further method step F') for removing the auxiliary liquid. Different embodiments of the method provide, for example, for step F') to take place after step C') and/or after step D'). Step F') may also take place during step C') and/or D').

The removal of the auxiliary liquid may include a heating of the electrode material, for example to a temperature between 30 and 120° C., preferably, to 40 to 100° C., more preferably, to 50 to 90° C. Alternatively or additionally, the removal of the auxiliary liquid may take place under a pressure reduced relative to standard pressure, for example, at a pressure of less than 800 hPa, preferably, less than 500 hPa, more preferably, less than 300 hPa.

The method according to the invention is preferably carried out at a low relative atmospheric humidity of, for example, less than 50% or less than 30%. Under these conditions, the auxiliary liquid is removed by evaporation, without the need for additional heating or sub-atmospheric pressure. Preferably, the method according to the invention is carried out at least partially under such low relative atmospheric humidity, for example, under dry room conditions.

According to an alternative embodiment, the auxiliary liquid includes one or more of the organic solvents which are also present in the electrolyte. The preferred organic solvents are selected, accordingly, from the same group as those of the electrolyte. One advantage associated with using the same group of organic solvents is that there is no need for removal of the auxiliary liquid, owing to the compatibility of the auxiliary liquid with the electrolyte. Alternatively, the auxiliary liquid which is already present in the electrochemically active coating after method step B') is taken into account when supplying the electrolyte in method step E'). It is possible, for example, to introduce the conductive lithium salt in the supplied electrolyte at a concentration that is increased relative to a target level in the lithium-ion cell. In this way, as a result of the diluting effect of the auxiliary liquid already present in the electrochemically active coating, the conductive Li salt after method step E') is then in the required target concentration.

In one preferred embodiment, the auxiliary liquid is anhydrous and/or aprotic.

DETAILED DESCRIPTION OF THE DRAWINGS

Figure 1:
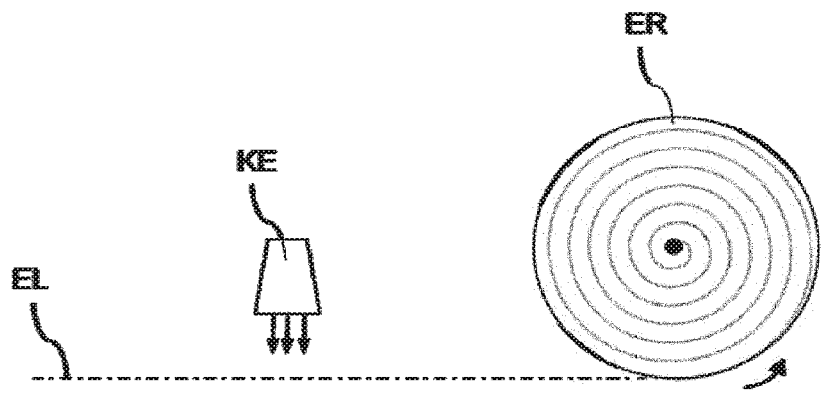
FIG. 1 shows schematically an embodiment of the method according to the invention, where an electrode EL is contacted via a contacting device KE, such as a spraying device or sprinkler system, for example, with the electrolyte and/or auxiliary liquid (indicated by the three vertical arrows) and then wound to form the roll ER.
Figure 2:
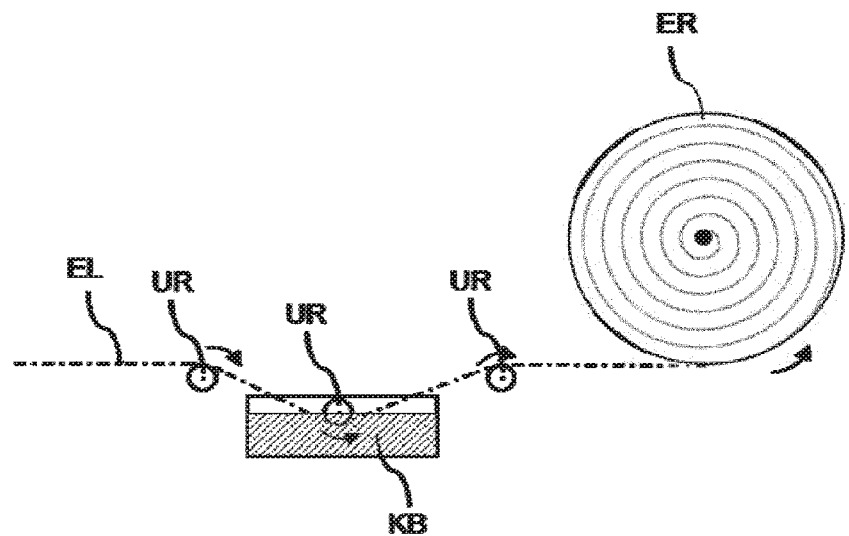
FIG. 2 shows schematically another embodiment of the method according to the invention, where an electrode EL is guided over deflecting rollers UR through a contact bath KB of electrolyte and/or auxiliary liquid, and then wound to form the roll ER.

The figures are purely exemplary in character and are not restricted to the feature combinations shown. For example, the schematic representation of the electrode EL may also represent a combination of a component sequence of an anode, a separator, a cathode, and a separator. Instead of the roll ER, it is also possible to assume a prismatic flat winding or a cutting device, such as a punch. It is likewise possible to add or omit individual features shown, or particular embodiments shown, provided the general technical teaching of the invention remains realized. In this sense, furthermore, the invention embraces any combination of features of the claims and of the description, even if that combination of features is not expressly mentioned.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a lithium-ion cell, comprising the following steps:
   A') providing a first electrode having a first electrode collector and a first electrochemically active coating applied onto the first electrode collector, and a second electrode having a second electrode collector and a second electrochemically active coating applied onto the second electrode collector,
   B') contacting at least part of the first and/or second electrochemically active coating with an auxiliary liquid,
   C') cutting, winding and/or folding the first and/or second electrode, wherein step C') is carried out after step B'),
   D') combining the first electrode with a separator and the second electrode, and
   E') supplying an electrolyte,
   wherein the method further comprises a step F') for removing the auxiliary liquid, wherein the removal of the auxiliary liquid takes place by heating the first and/or second electrode to a temperature between 30 and 120° C., and wherein step F') is carried out during step C') and/or step D').

2. The method according to claim 1, wherein step C') is carried out before and/or after step D').

3. The method according to claim 1, wherein after the contacting in step B'), the part of the first and/or second electrochemically active coating has the auxiliary liquid in a volume fraction of at most 60% in relation to the total volume of the part of the first and/or second electrochemically active coating.

4. The method according to claim 1, wherein after the contacting in step B'), the part of the first and/or second electrochemically active coating has the auxiliary liquid in a volume fraction of at least 10% in relation to the total volume of the part of the first and/or second electrochemically active coating.

5. The method according to claim 1, wherein the auxiliary liquid has a boiling point of at most 120° C. under chemical standard conditions.

6. The method according to claim 1, wherein the auxiliary liquid is anhydrous and/or aprotic.

7. The method according to claim 1, wherein the first and/or second electrochemically active coating has a layer thickness of at least 75 μm.

8. The method according to claim 1, wherein the first and/or second electrode is coherent in sheet form in a longitudinal direction.

9. The method according to claim 8, wherein the first and/or second electrode is conveyed in step C') along the longitudinal direction at a speed of at least 5 m/min.

10. The method according to claim 1, wherein the first and/or second electrochemically active coating contains no plasticizer.

11. A method for producing a lithium-ion cell, comprising the following steps:
   A') providing a first electrode having a first electrode collector and a first electrochemically active coating applied onto the first electrode collector, and a second electrode having a second electrode collector and a second electrochemically active coating applied onto the second electrode collector,
   B') contacting at least part of the first and/or second electrochemically active coating with an auxiliary liquid,
   C') cutting, winding and/or folding the first and/or second electrode, wherein step C') is carried out after step B'),
   D') combining the first electrode with a separator and the second electrode, and
   E') supplying an electrolyte,
   wherein the auxiliary liquid is not removed prior to supplying the electrolyte in step E').

* * * * *